US008529265B2

(12) United States Patent
Cornale (10) Patent No.: US 8,529,265 B2
(45) Date of Patent: Sep. 10, 2013

(54) METHOD FOR TEACHING WRITTEN LANGUAGE

(76) Inventor: Kayla Cornale, Burlington (CA)

( * ) Notice: Subject to any disclaimer, the term of this patent is extended or adjusted under 35 U.S.C. 154(b) by 1681 days.

(21) Appl. No.: 11/429,703

(22) Filed: May 8, 2006

(65) Prior Publication Data

US 2007/0020592 A1 Jan. 25, 2007

(30) Foreign Application Priority Data

Jul. 25, 2005 (CA) .................................. 2513232

(51) Int. Cl.
*G09B 19/00* (2006.01)

(52) U.S. Cl.
USPC ........... 434/167; 434/308; 434/178; 434/236; 434/317

(58) Field of Classification Search
USPC .............. 84/470 R; 434/156, 317, 167, 178, 434/236, 308
See application file for complete search history.

(56) References Cited

U.S. PATENT DOCUMENTS

| | | | |
|---|---|---|---|
| 3,136,072 A | 6/1964 | Ross | |
| 4,397,635 A * | 8/1983 | Samuels | 434/178 |
| 5,195,895 A * | 3/1993 | Clynes | 434/236 |
| 5,404,444 A * | 4/1995 | Billings | 715/839 |
| 5,538,430 A * | 7/1996 | Smith et al. | 434/178 |
| 5,558,520 A * | 9/1996 | Werzberger | 434/317 |
| 5,860,064 A * | 1/1999 | Henton | 704/260 |
| 6,334,104 B1 * | 12/2001 | Hirai | 704/258 |
| 6,341,958 B1 * | 1/2002 | Zilberman | 434/157 |
| 6,385,581 B1 * | 5/2002 | Stephenson | 704/270 |
| 6,422,871 B2 * | 7/2002 | Shepherd | 434/236 |
| 7,563,099 B1 * | 7/2009 | Iftikhar | 434/167 |
| 2001/0042057 A1 * | 11/2001 | Ikebe et al. | 706/11 |
| 2004/0029083 A1 | 2/2004 | Coleman | |
| 2005/0014124 A1 * | 1/2005 | Haeni | 434/393 |
| 2006/0191398 A1 * | 8/2006 | Sternal | 84/483.2 |

OTHER PUBLICATIONS

Cornale, Kayla. Sounds into Syllables—A Teaching System for Autistic Children. Complete Abstract. [online], [retrieved Mar. 29, 2010]. Retrieve from the Internet: <http://formerbasef.ca/2005/results/gallery/display_abstract.cgi?project_id=M02>.*

Abramson, Keren. (n.d.) The Role of Music in Developing Communication Skills in Children with Autistic Spectrum Disorder. Retrieved Jul. 2, 2004 from http://home.ican.net.

American Academy of Neurology. (2002). Researchers Shed Light on Early Brain Growth and Autism. Retrieved Mar. 10, 2005, from http://www.sciencedaily.com.

American Music Therapy Association. (2003). Music Therapy in Special Education. Retrieved Mar. 11, 2005, from http://www.coastmusictherapy.com.

Autism Connect. (2004). People with autism use shape-processing part of Brain to remember letters. Retrieved Jan. 10, 2005, from http://www.autismconnect.org.

(Continued)

*Primary Examiner* — Xuan Thai
*Assistant Examiner* — Peter Egloff
(74) *Attorney, Agent, or Firm* — Faegre Baker Daniels LLP (57) ABSTRACT

A system and method for teaching combining letters, images and sounds. A keyboard having letters on keys has sounds associated with each key. Keys for words used in a lesson may be highlighted to provide clues how to spell a word. Sounds associated with a selected word may be played upon the successful completion of spelling of the word on the keyboard.

5 Claims, 11 Drawing Sheets

(56) References Cited

OTHER PUBLICATIONS

Autistic Society, (2005). New clue to autistic children's problems with spoken language? Retrieved Aug. 4, 2005, from http://www.autisticsociety.org/autism-article 23.html.

Barron-Cohan, S., Hill, J., Golan, O., and Wheelwright, S., (n.d.). Electronic Emotions Encyclopaedic. Retrieved Jul. 26, 2005, from http://www.autism today.com.

Bennett, Sue. (n.d.). Intriguing connections between giftedness and autism, music and language. Retrieved Nov. 26, 2005, http://www.autismcoach.com.

Benson, Etienne. (2003). Making sense of chords and conversations. Retrieved Nov. 26, 2005, from http://www.apa.org/monitor/julaug03/chords.html.

Boeree, C. George. (2006). The Lobes. Retrieved Feb. 22, 2006, from http://www.ship.edu/~cgboeree/lobes.html.

Browndyke, J.N. (2002). Neuropsychosocial Factors in Emotion Recognition: Facial Expressions. Retrieved Jan. 15, 2006, from www.neuropsychologycentral.com.

Kuhn, Robert. (2004.). Interview with Jeanne Bamberger, Robert Freeman and Mark Tramo. http://www.pbsorg/keet/closertotruth/explore/learn_07.html.

Lake, Nell. (2002). This is Your Brain on Music. Harvard Magazine. Retrieved Mar. 10, 2005, from http://www.harvardmagazine.com/on-line/03025 .html.

Leutwyler, Kristen. (2001). Exploring the Musical Brain. Retrieved Feb. 16, 2006, from http://www.sciam.com/article.cfm?articleID.

Liberman, Mark. (2004). Autism as Lack of Neurological Coordination. http://itre.cis.upenn.edu/~my/ languagelog/archives/001292.html.

Medical Study News. (2004). Autism results from failure of brain areas to work together. Retrieved Jan. 10, 2005, from http://www.ncws-medical.net/?id=6538.

Megginson, David. (1996). Hypergrammar. Retrieved Jan. 5, 2006 from http://www.uottawa.ca/academic/arts/writcent/hypergrammar.html.

Moore,.M., et al. (2000). Brief Report: Vocabulary acquisition for children with autism. http://www.ncbi.n/m.nih.gov/entrez/query.fcgi?cmd=Retrievedb=PubMed&listuids=1103.

Munger, David. (2006). Do Kids Recognize Emotion in Music? Retrieved Nov. 10, 2005, from http://www.cognitivedaily.com/?P=102.

National Institute of Mental Health. (2004). Autism Spectrum Disorder (Pervasive Develpmental Disorders). http://nimh.nih.Gov/publicat/autism.cfm.

Owen, James. (2005). Herders' Whistled Language Shows Brain's Flexibility. http://news.nationalgeographic.com.

Foxton, Jessica et al. (2003). Absence of auditory 'global interference' in autism. Brain vol. 126, No. 12 p. 2703-2709.

Glass Miller, Marianne. (2004). Autistic Brain Recalls Letter of the Alphabet in Brain Areas Dealing with Shapes. http://www.medical/newstoday.com.

Grandin, Temple. (2002). Teaching Tips for Children and Adults with Autism. Retrieved Jan. 29, 2005, from http:// www.autism.org.

Grandin, Temple. (2000). My Experiences with Visual Thinking, Sensory Problems and Communication Difficulties http://www.autism.org.

Goode, Erica. (2004). Lifting the Veil of Autism, One by One by One. Retrieved Dec. 10, 2005, from http://www.fathersnetwork.org/881.html.

Happe, Francesca. (1994). Autism—An Introduction to Psychological Theory. Cambridge, Massachusetts: Harvard University Press.

Heaton, P., et al. (1999). Can children with autism spectrum disorders Perceive affect in music? An Experimental Investigation. Retrieved Feb. 23, 2006, from www.ncbi.n.

Hutinger, P., and Rippey, R. (1995). How Five Preschool Children with Autism Responded to Computers. Retrieved Sep. 14, 2004, from http:/www.wiu.edu.

Just, Marcel. (2004). Written Testimony before the House Government Reform Subcommittee on Human Rights and Wellness. Retrieved Mar. 19, 2006 from http://72.14.203.104.

Kalb, Claudia. (2005.). When Does Autism Start? Newsweek Magazine, 44-53.

Boddy-Evans, Marion. (2004), Right Brain and Left Brain Inventory. Retrieved Mar. 11, 2005, from http://painting.about.com/library/blpaint/blrightbraintable.htm.

Boddy-Evans, Marion. (2004). Right Brain/Left Brain: What Is It All About? Retrieved Mar. 11, 2004, from http://painting.about.corn/library/blpaint/blrightbrain.htm.

Bloom, Floyd., Flint Beal, M., and Kupfer, David J. (2003). The Dana Guide toBrain Health. New York: The Free Press.

Brain. (2002). In McGraw-Hill Encyclopaedia of Science & Technology. 9th Ed. Carnegie Mellon University. (2004). Carnegie Mellon and University of Pittsburgh.

Cromie, J. William. (2006). The First Word on Nouns and Verbs. Retrieved Feb. 22, 2006, from Harvard University Gazette Website: http://www.news.harvard.edu.

Cromie, J. William. (2001). Music on the Brain: Researchers Explore the Biology of the brain. Retrieved Dec. 27, 2004, from Harvard University Gazette Website.

Downey, M.K. (No date). Music for the Child with Autism. Retrieved Jul. 10, 2004, from http://mkdowney.com/music.htm.

Economic & Social Research Council. (2004). Autistic Children Show Outstanding Musical Skills. Retrieved Jan. 4, 2005, from http:/www.sciencedaily.com.

Edelson, M. Stephen. (n.d.). Autism: Theories of Autism. Retrieved Feb. 13, 2006, from http://www.psych.rice.edu/mmtbn/autism/autism Theory.html.

Edelson, M. Stephen. (1999). Overview of Autism. Retrieved Nov. 6, 2005, from http://www.autism.org/overview.html.

Pierce, Karen et al. (2001). Face processing occurs outside the fusiform 'face area' in autism: evidence from functional MRI. Brain, vol. 124, No. 10, 2059-2073.

Peretz, Isabelle and Hyde, Krista. (2003). What is specific to music processing? Insights from congenital amusia.from http:// tics.Trends.com.

Piven, J., Bailey, J., Ranson, B., and Arndt, S. (1997). An MRI Study of the Corpus Callosum in Autism. American Journal of Psychiatry 154, p. 1051-1056.

Potts, Jonathan. (2004). Carnegie Mellon, University of Pittsburgh Scientists Discover Biological Basis for Autism. http://www.cmu.edu/cmnews/extra/040809_autism.html.

Potts, Jonathan. (2004). Carnegie Mellon and University of Pittsburgh Scientists Discover Left-Brain/Right-Brain Differences in People with Autism. http://www. cmu.edu.

Restak, Richard. (2001). The Secret Life of the Brain. United States: The Dana Press and Joseph Henry Press.

Restak, Richard. (2003). The New Brain. United States: St. Martin's Press.

Ratey, John J. (2001). A User's Guide to the Brain. Toronto: Random House of Canada Limited.

Schultz, T. Robert et al. (2003). The role of the fusiform face area in social cognition: implications for the pathobiology of autism. http://info.med.yale.edu.

Schultz, T. Robert, Klin. Ami. (2002). Genetics of Childhood Disorders: Autism Part 2: Neural Foundations. http://info.med.Yale.edu.

Schwarz, Joel. (2001). Mother is just another face in the crowd to autistic children. http://www.uwnews.org/article.asp?articleID=2333.

Schwarz, Joel. (2005). Shepherds whistle while they work and brains process sounds as language. http://wwweurekalert.org/pub_releases/2005/01/uow-sww123004.php.

Science Daily. (2000). People with autism and Asperger Syndrome process faces as Objects, Yale study of brain abnormalities finds. http://sciencedaily.com.

Sinclair, Jim. (1993). Don't Mourn for Us. Retrieved Jul. 17, 2004, from http://www.autistics.org/library/dontmourn.html.

Society of Neuroscience. (2005). Scientists Unravel Brain Circuits Involved in Joy and Sadness. http://apu.sfn.org/content/AboutSFNI/NewsReleases/am2002_emotion.html.

Stansell, Jon. (2005). The Use of Music for Learning Languages: A Review of the Literature. http://www.mste.uiue.edu.

Staum, Myra J. (n.d.). Music Therapy and Language for the Autistic Child. Retrieved Feb. 19, 2005, from http://www.autism.org/music.html.

University of Michigan. (2004). Early Intervention Lessens Impact of Autism. Retrieved http:www.sciencedaily.com/ releases/2004/06/040616063622.htm.

Weinberger, M. Norman. (1999). Brain Anatomy and Music. Retrieved Mar. 18, 2004, from http://www.musica.uci.edu/mm/V6I2599.html.

Weinberger, M. Norman. (1999). Can Music Really Improve the Mind? The Question of Transfer Effects. http://www.musica.uci.edu/mm/V6I2S99.html.

Weinberger, M. Norman.(2004). Music and the Brain. http://sciam.com/print_version.cfm?article ID=007D716-71A1-1179-AF868341 4B7F0000.

Williams, C., Wright B., Callaghan G., and Coughlan, B. (2002). Do children with autism learn to read more readily by computer assisted instruction or traditional book method.

Wittlin, Maggie. (2005). Cartoon shed light on Autism. Retrieved Mar. 3, 2005, from http://www.yaledailynews.com/articlefunctions/Printerfri endly.asp?AID=28555.

Goldberg, We feel your pain.. and your happiness too Dec. 12, 2005 http://www.boston.com.

Powell, Opening a Window to the Autistic Brain, 2004 http://biology.plosjournals.org.

Cornale, Kayla, "Windows to Their World," Bay Area Science & Engineering Fair, 2-volume bench book, Mar. 31 to Apr. 4, 2004, pp. 1-53.

Cornale, Kayla, Abstract for "Sounds and Syllables: A Teaching System for Autistic Children" presentation, 56th International Science and Engineering Fair, Phoenix, Arizona, May 8-14, 2005, 4 pages.

* cited by examiner

METHOD FOR TEACHING WRITTEN LANGUAGE

FIELD OF THE INVENTION

The present invention relates to the field of teaching, and more particularly, to methods of teaching literacy, mathematics and social interaction.

BACKGROUND OF THE INVENTION

Literacy is a critical element of a child's education. However, learning to read is a difficult task for many children, and can be especially difficult for children suffering from Autism Spectrum Disorder. Autistic children also can have difficulty identifying facial expressions, and also can have difficulties with mathematics.

SUMMARY OF THE INVENTION

A method for teaching literacy to a student forms one aspect of the invention. The method comprises the step of providing an apparatus, said apparatus including: a keyboard having a plurality of keys each bearing a different letter of the alphabet; and sound production means for associating a different sound to each key of said plurality and adapted to produce in response to a keystroke the sound associated with such key. The method further comprises the steps of: displaying a first word to said student; and causing the keys bearing the letters which form said first word to be stroked.

A computer program product forms another aspect of the invention. The product comprises a memory having computer-readable code embodied therein for execution by a computer, said computer including a keyboard, viewing screen, speaker and processor, which code, when executed by the processor, causes the computer to: associate a different sound to each alphabetic key of the keyboard; display on the screen a first word; and, in response to the stroke of a key bearing a letter which forms said first word, produce the sound associated with such key.

Forming another aspect of the invention is a method for teaching emotions and grammatical structures to a student. This method comprises the step of: presenting a sentence to the student, said sentence including a word to be taught to the student, said word being either: an emotion word selected from the group consisting of happy, sad, afraid, angry, surprised and disgusted; or a noun, verb or adjective. The method further comprises the steps of: reading the portion of the sentence preceding the word to be taught; playing a harmony associated with the type of word to be taught, said type being one of happy, sad, afraid, angry, surprised and disgusted, noun, verb and adjective; reading and spelling the word to be taught; playing the harmony associated with the type of word; and reading the portion of the sentence following the word.

Advantages, features and characteristics of the present invention will become more apparent upon consideration of the following detailed description and the appended claims with reference to the accompanying drawings, said drawings being briefly described hereinbelow.

DETAILED DESCRIPTION

A method for teaching literacy to a student according to a first preferred embodiment of the present invention is hereinafter described.

Figure 1:
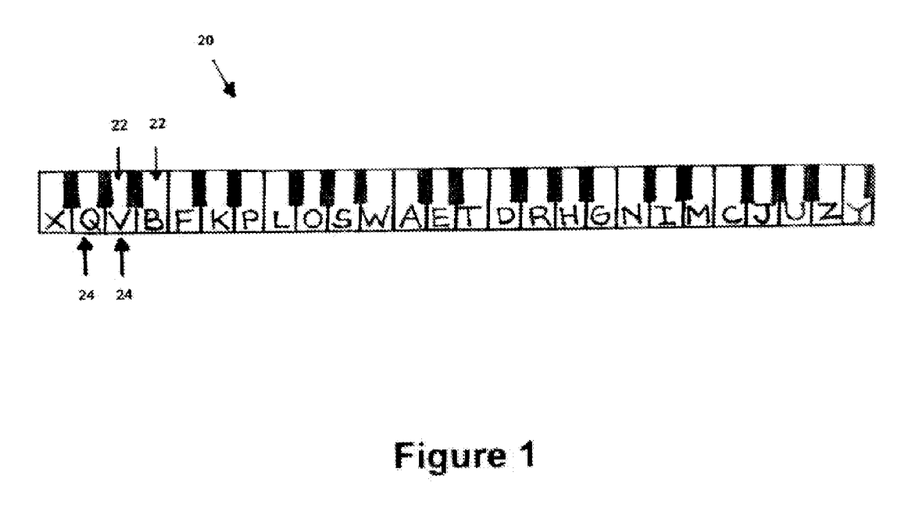
FIG. 1 is a top plan view of the keyboard of a keyboard apparatus used according to one aspect of the invention.

With reference to FIG. 1, as a first step in the method, an apparatus (not shown) having a keyboard 20 is provided to the student. The apparatus is preferably a piano or an organ, wherein alphabetic characters 24 have been demarcated in a conventional manner on the keys 22. The letters 24 are demarcated on the keyboard 20 so that more commonly used letters 24 are grouped together in the centre of the keyboard 20, and more rarely used letters 24 are disposed on the periphery of the keyboard 20. Letters that are commonly used together, such as "t" and "h", are also grouped closely to one another. As shown, the letter placement is suitable for English language instruction.

Figure 2:
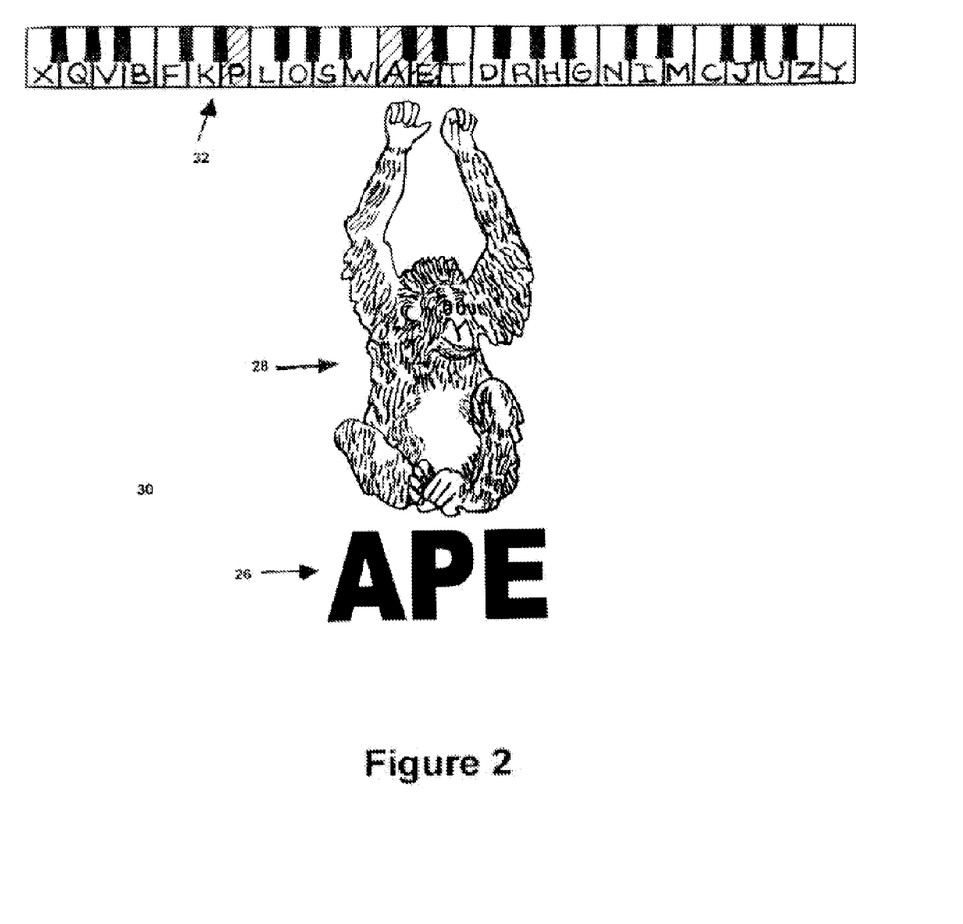
FIG. 2 is a view of an exemplary exercise sheet used in the method of a first preferred embodiment of the invention.

With reference to FIG. 2, as subsequent steps in the method, an instructor displays a word 26 and a pictorial representation 28 of the word 26 to the student, and preferably states and spells the word 26 aloud to the student. The word 26 and pictorial representation 28 are preferably displayed to the student on an exercise sheet 30, as shown in FIG. 2 in exemplary fashion. The letters forming the word 26 are preferably constructed out of felt or otherwise textured, to add tactile interest. The sheet 30 also includes a representation 32 of the keyboard 20, in which the keys bearing the letters forming the word 26 are highlighted.

Preferably, the student is directed to spell the word 26 using the keyboard 20. Alternatively, the instructor may spell the word 26 using the keyboard 20. As the keys 22 are stroked, the sound or tone associated with each key 22 will be produced. Preferably, once the student has depressed the keys 22 bearing the letters forming the word 26, the instructor communicates to the student that he or she has completed the exercise, states the word aloud and causes a sound associated with the word to be created. For example, in the case of the word "APE", the instructor may play a recording of a howling ape.

A lesson will typically include a plurality of such exercises, and typically, a plurality of exercise sheets 30, each bearing a unique word and associated pictorial depiction, will be collected into book form for convenience.

Figure 8:
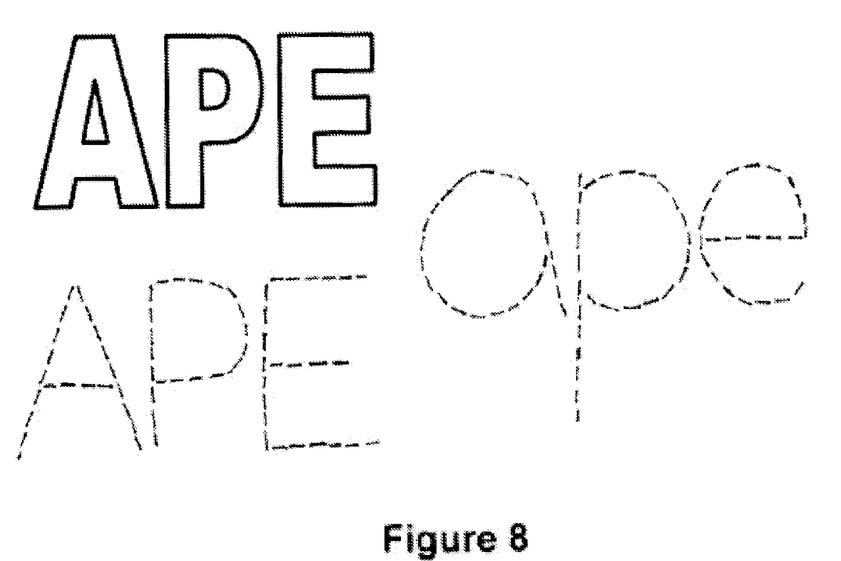
FIG. 8 is an exemplary work book page used according to another aspect of the invention.

For reinforcement, an audio recording may be provided, which can be listened to during free time. A preferred audio recording includes a complete lesson. For each exercise: the word is read aloud; the word is spelled out; the tones associated with the letters forming the word are played; the word is again read aloud; and a sound effect associated with the word is played. The instructor may also use audio recording for the purpose of playing the sound effect as discussed earlier. A workbook may also be provided to the student, to reinforce the lesson. An exemplary worksheet is shown in FIG. 8, which includes various images of the word for the student to trace and color.

Figure 3:
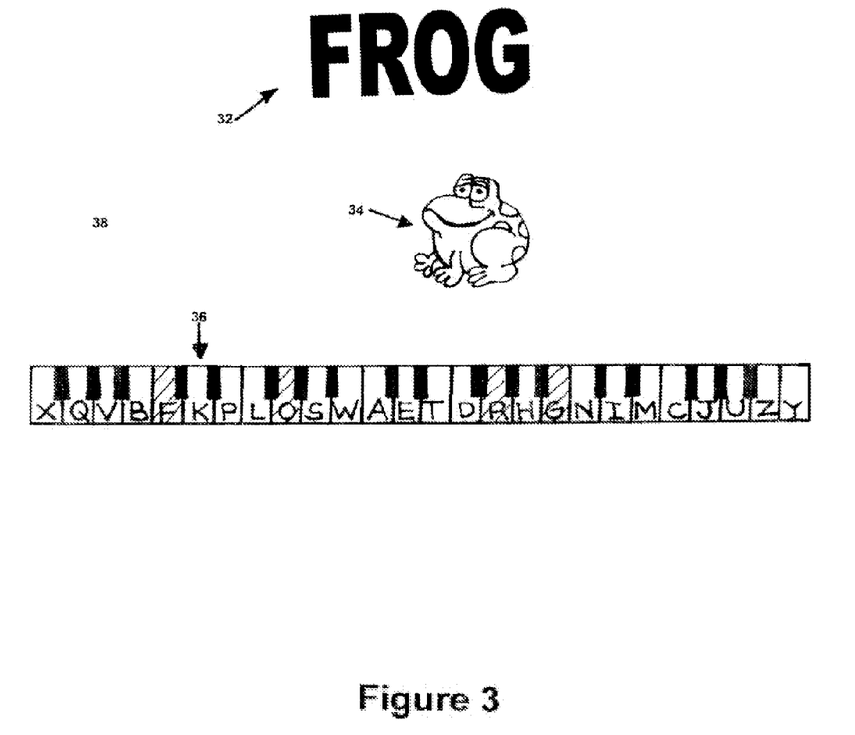
FIG. 3 is a view of an exemplary first exercise sheet used in the method of a second preferred embodiment of the invention.
Figure 4:
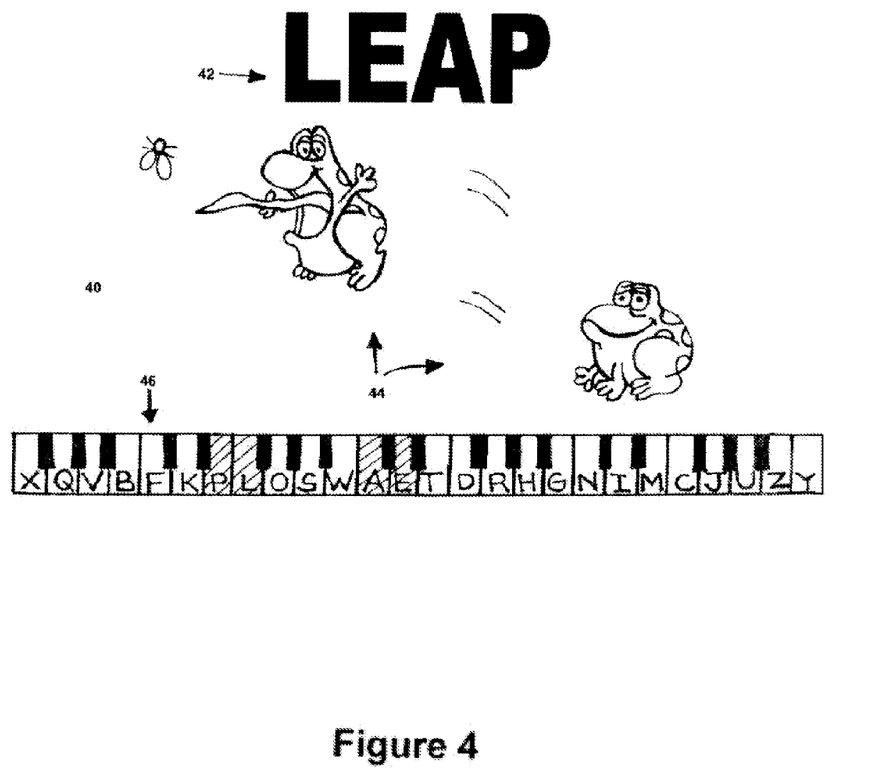
FIG. 4 is a view of an exemplary second exercise sheet used in the method of the second preferred embodiment of the invention.

A variation of the foregoing method forms a second preferred embodiment of the invention. In this method, the exercise consists of two words, namely, a noun and a verb associated with the noun. The noun 32, a pictorial representation 34 of the noun and a keyboard image 36, in which the keys bearing the letters forming the noun are highlighted, appear on a first sheet 38, as shown in FIG. 3. The noun 32 is the word "FROG" and the pictorial representation 34 is a picture of a frog. On a second sheet 40, indicated by FIG. 4, there is displayed a verb 42 associated with the noun 32, namely, the word "LEAP", a pictorial representation 44 of the verb 42 and noun 32, specifically, an image of a frog leaping, and a keyboard image 46 in which the keys bearing the letters forming the verb are highlighted. In this embodiment, the instructor initially shows the first sheet 38 to the student, preferably states and spells the word 32 aloud, and directs the student to spell the noun 32 using the keyboard 20. As the student strokes the keys 22, the sound or tone associated with each key 22 will be produced. Once the student has depressed the keys 22 bearing the letters forming the noun 32, the instructor preferably states the noun 32 aloud; presents the second sheet 40 to the student; states and spells aloud the verb 42 and directs the student to spell the verb 42 using the keyboard 20. As the student strokes the keys 22, the sound or tone associated with each key 22 will be produced. Once the student has depressed the keys 22 bearing the letters forming the verb 42, the instructor preferably states the word 42 aloud, whereupon the exercise is complete. A typical lesson includes a plurality of exercises of the aforedescribed type, and typically, a plurality of pairs of exercise sheets 38,40 will be collected into book form for convenience.

Figure 5:
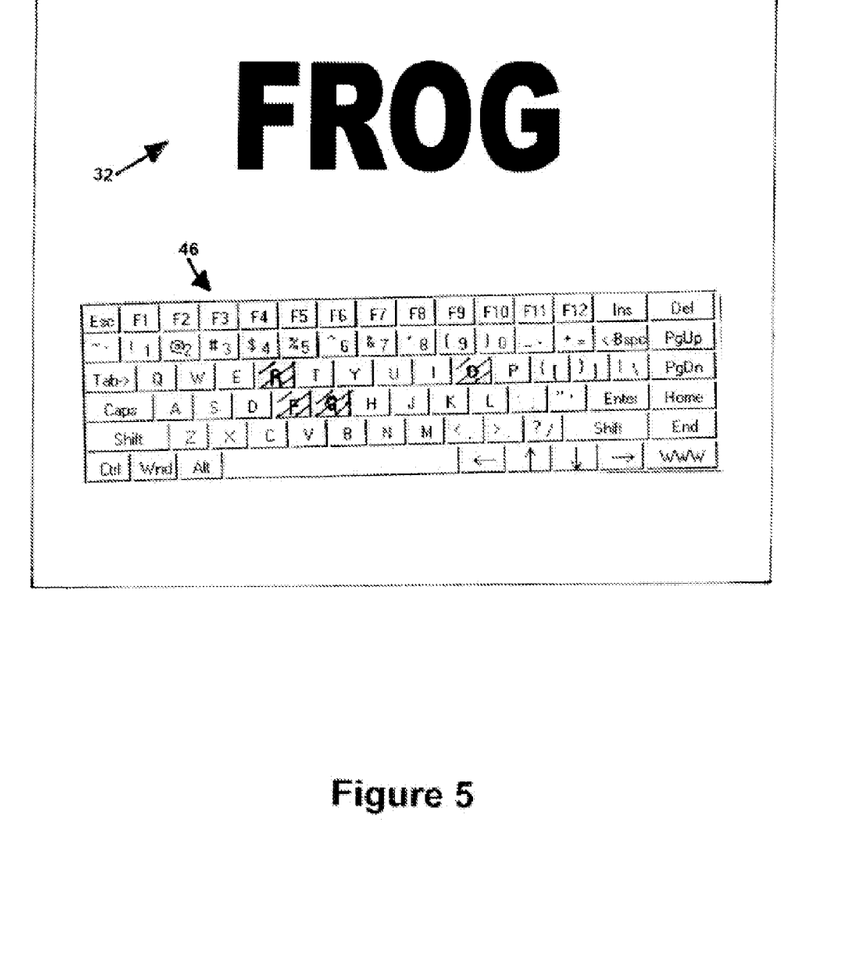
FIG. 5 is an exemplary screen shot produced by computer code according to a third preferred embodiment of the invention when in use by a computer, showing a noun.
Figure 6:
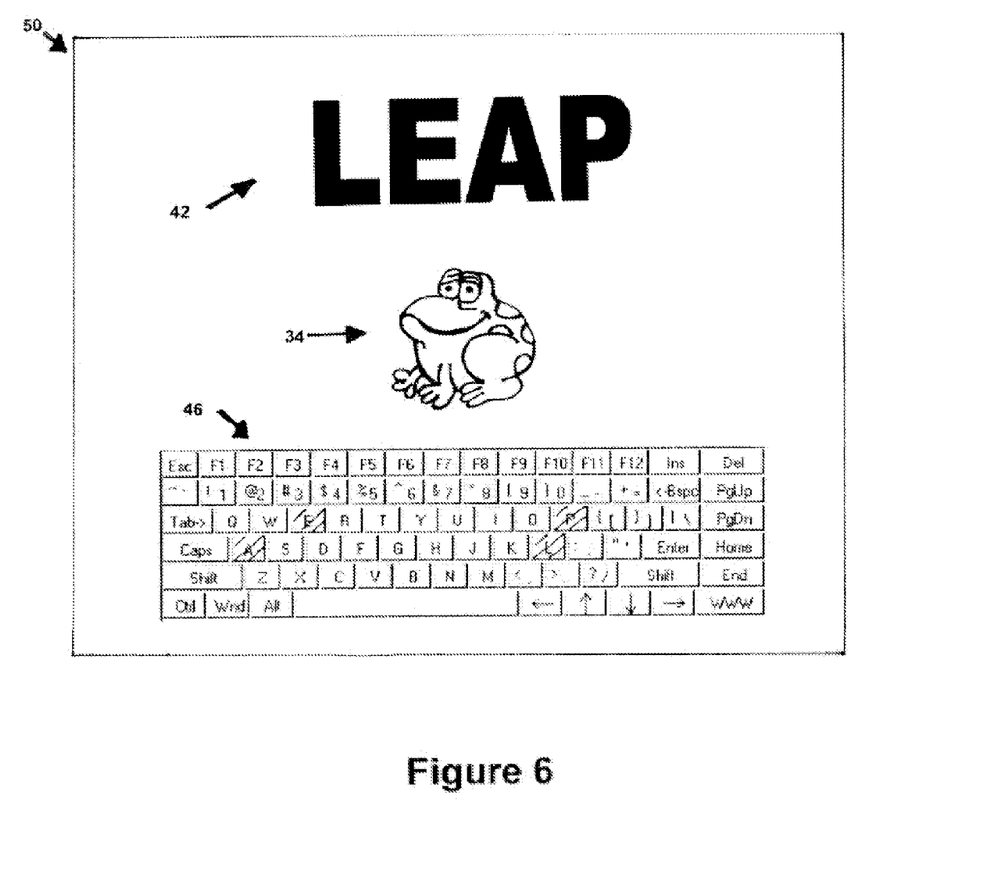
FIG. 6 is a view similar to FIG. 4, showing a verb.
Figure 7A:
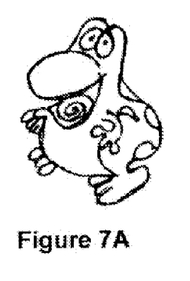
FIG. 7A is a first frame of an animation.
Figure 7B:
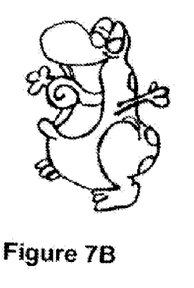
FIG. 7B is a second frame of an animation.
Figure 7C:
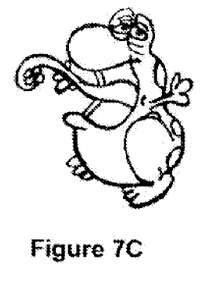
FIG. 7C is a third frame of an animation.
Figure 7D:
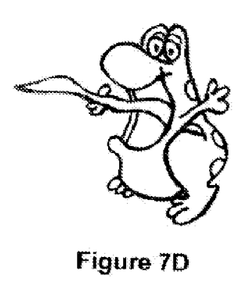
FIG. 7D is a fourth frame of an animation.

A third preferred embodiment of the invention comprises computer-readable code embodied on a carrier wave or a computer memory product. The code is for execution by a computer (not shown) including a keyboard, a viewing screen, a speaker and a processor. When executed by the processor, the code causes the computer to associate a unique sound to each alphabetic key of the computer keyboard and to display on the computer screen 48 as shown as FIG. 5, a word 32, specifically, a noun. The screen 48 also displays an image of a computer keyboard 46', wherein the keys which bear the letters forming the word are highlighted. The code causes the computer to, in response to the stroke of a key on the computer keyboard bearing a letter which forms said word, produce the sound associated with such key. No sound is produced when keys bearing letters that do not appear in the 32 word are stroked. Once the student has depressed the keys bearing the letters forming the word 32, the student may press the space bar of the keyboard to cause the screen to display a pictorial image 34 of the word, as shown in the screen shot 50 of FIG. 6. In addition to the pictorial image 34, the screen will also show a further word, specifically, a verb 42, which is related to the image, and an image 46' of a keyboard wherein the keys which bear the letters forming the verb 42 are highlighted. The code causes the computer to, in response to the stroke of a key bearing a letter which forms said verb 42, produce the sound associated with such key. No sound is produced when keys bearing letters that do not appear in the verb 42 are stroked. Once the student has depressed the keys bearing the letters forming the word 42, the student may select the image 34 on the screen with the mouse, which triggers a moving picture to be displayed on the screen that is illustrative of the verb and noun. In the case of the noun and verb combination of FROG and LEAP, the moving picture would be a leaping frog, as shown by the sequence 7A,7B, 7C,7D. This completes the exercise. A typical lesson will include a number of exercises delivered in sequence.

The method was tested on a 9 year girl diagnosed with PDD-NOS. Prior to being exposed to the teaching method, she was unable to spell or read any words and had a marginal comprehension of the alphabet. The test subject was given weekly instruction according to the method. Each session lasted between roughly 45 minutes and 1 hour. After approximately one year, the subject was able to spell (both verbally and musically) over 20 nouns and related verbs, and grasped the relationship between nouns and verbs.

Figure 9:
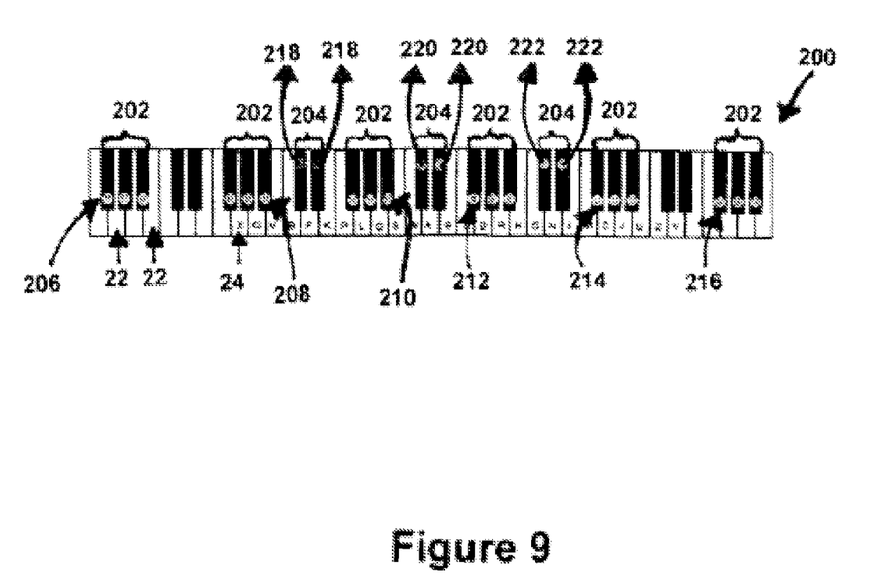
FIG. 9 is a top plan view of the keyboard of a keyboard apparatus used according to one aspect of the invention.

A fourth preferred embodiment of the method involves a keyboard 200, as shown in FIG. 9, which is somewhat similar to keyboard 20. On this keyboard 200, alphabetic characters 24 have again been demarcated in a conventional manner on the keys 22. Additionally, six 3 part musical harmonies 202 were created using 18 black piano keys. Each 3 part harmony 202 is crafted so as to suggest one of the six universal emotions: happy, sad, afraid, angry, surprised and disgusted. Each 3-part harmony 202 is marked with matching yellow face stickers 206,208,210,212,214,216, wherein the facial expression corresponds with the emotion. In addition, three 2-part harmonies 204 were created using an additional 6 black piano keys, each being marked with red 218 (for nouns), green 220 (for verbs) and blue 222 (for adjectives) circular stickers.

A story book is also provided (not shown). In the book, portions of the text are highlighted in colours associated with grammatical elements and emotional elements. That is, certain nouns are presented in red text, certain verbs are presented in green text, certain adjectives are presented in blue text, and emotions (happy, sad, etc.) are presented in yellow text. The remaining text is presented in black. Typically, on each page, only one word is highlighted, for simplicity, although at random intervals, two grammatical structures may be emphasized in a single sentence.

As the child progresses through the story, the pages are presented to the child.

When an emotion page is reached, the applicable 3-part harmony provided for that emotion is played before and after the emotion word is read and spelled. Drawings on these pages are provided and crafted to exaggerate and emphasize the facial expression associated with each emotion, and the reason for the emotion.

When a grammar page is reached, the sentence is read and the grammatical element is spelled. The 2-part harmony associated with the grammatical element (i.e. noun, verb, adjective) is played before and after the word is spelled.

A fifth preferred embodiment of the invention takes the form of a computerized version of the fourth embodiment.

Figure 10:
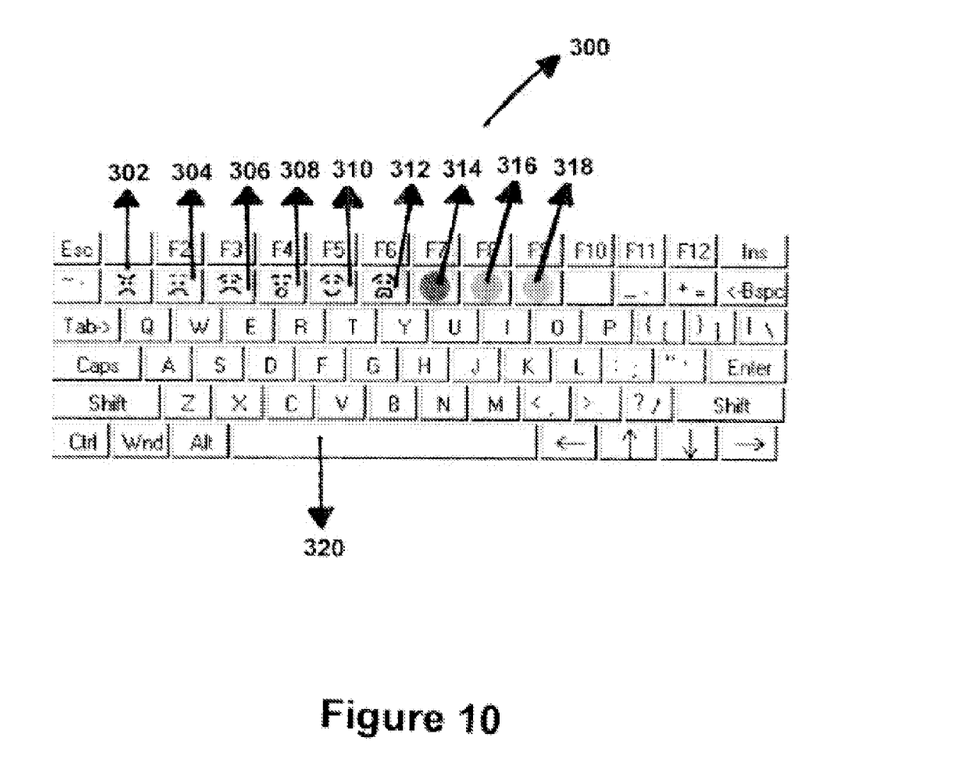
FIG. 10 is a view of a keyboard image displayed in a further aspect of the invention.

The computer program is adapted to display, in turn, the various pages of the story book. On each page of the electronic book, a computer keyboard image 300 is provided, as shown in FIG. 10, which has been modified with the six yellow emotion faces 302,304,306,308,310,312, three colour coded grammatical circles (red 314, green 316 and blue 318) and the musical alphabet characters 320.

The keyboards 300 are fully interactive, so that when the child is reading the motion page for "happy", he or she can click on the yellow "happy" face 310 to hear the 3-part harmony for happy.

Figure 11:
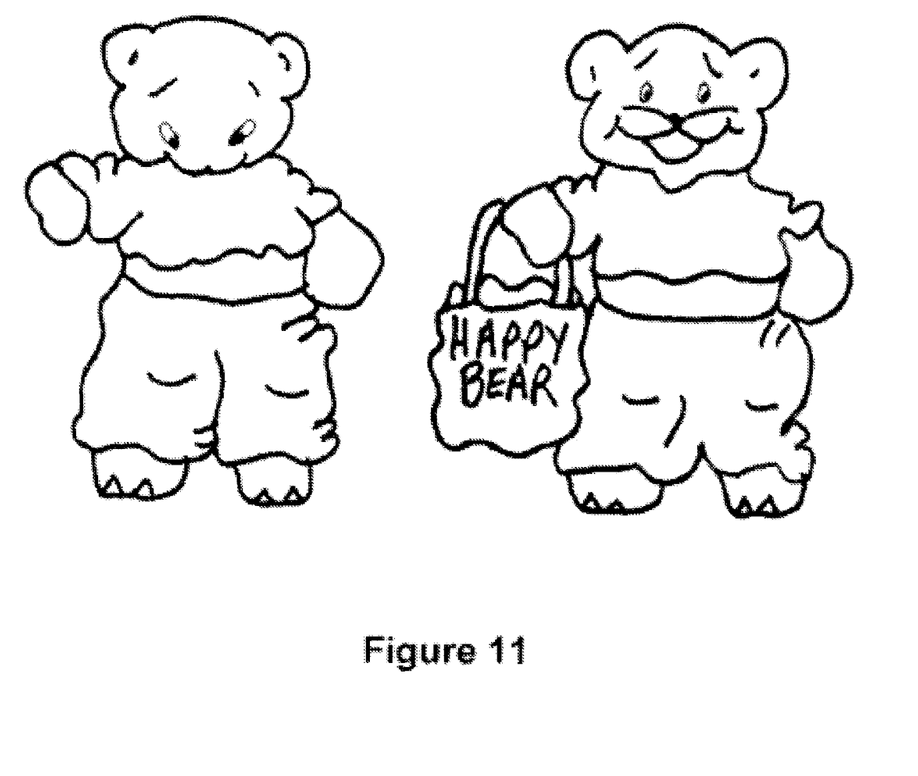
FIG. 11 is a view of exemplary drawings in a story book constructed according to an aspect of the invention.

Rollover images are provided for all the emotion pages, so that the child can rollover the neutral face of Little Bear and it will change to happy, sad or any one of the other emotional expressions used in the book. The rollover images for "happy" are shown by way of example in FIG. 11. Animations are also provided to illustrate points of action in the story and reinforce the role of verbs.

The above-described teaching methods are highly effective with children and adults, learning disabled and not, and allows each individual to become a better reader of words and facial expressions.

While but five embodiments of the present invention have been herein shown and described, it will be understood that various changes may be made. For example, whereas in the first and second preferred embodiments, a piano or organ is used by the child, it will be evident that a personal computer could readily be programmed to serve the function of the piano. Similarly, whereas the examples show English language instruction, the method and apparatus can be readily modified to provide instruction in other languages. Yet further, the method can be expanded to teach children how to add, subtract, multiply and divide using a further modification to the piano and computer keyboards as well as animal images. It will be evident that these modifications, and others which may be apparent to persons of ordinary skill in the art, may be made without departing from the spirit or scope of the invention. Accordingly, the invention should be understood to be limited only by the claims appended hereto, purposively construed.

What is claimed is:

1. A method for teaching using a computer, the computer including a display and a keyboard having a plurality of letter keys, said method comprising:

assigning each letter on the plurality of letter keys to a different musical note;

presenting a sentence to a student on the display, said sentence including a word to be taught to the student, said word being a noun, verb or adjective;

reading the portion of the sentence preceding the word to be taught;

playing a harmony associated with the type of word to be taught using the computer, said type being one of noun, verb and adjective;

displaying a representation of the keyboard on the display, wherein representations of the letter keys bearing letters that form the word to be taught are highlighted on the keyboard representation;

reading and spelling the word to be taught, wherein spelling the word includes (a) sequentially pressing the letter keys on the keyboard that are highlighted in the keyboard representation on the display and (b) playing the musical note associated with the letter on each pressed letter key that is highlighted in the keyboard representation;

playing the harmony associated with the noun, verb, or adjective using the computer; and reading the portion of the sentence following the word.

2. A method according to claim 1, wherein the harmony associated with each of noun, verb and adjective is a two-part harmony.

3. A method according to claim 1 wherein the sentence is presented to the student on a page, said page, when the word to be taught is an emotion, bearing an image of an animal exhibiting a facial expression reflecting said emotion.

4. A method according to claim 1, wherein the sentence forms part of a story.

5. A method according to claim 1, wherein the page is in a picture book.

* * * * *